G. B. Durkee,
Snap Hook,
No. 69,549. Patented Oct. 8, 1867.
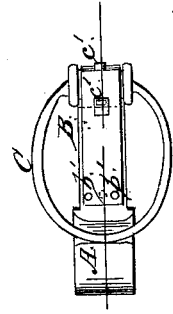
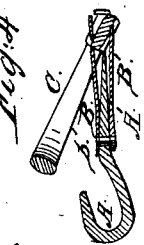
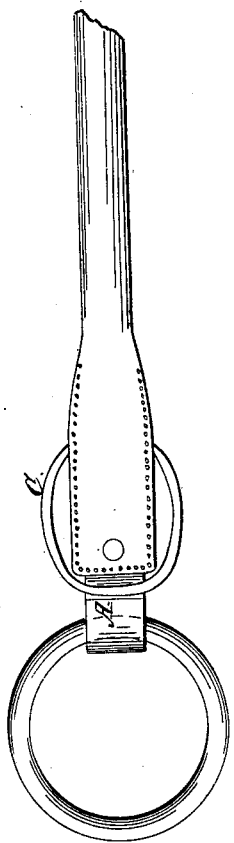
Witnesses:
B. H. Muehle
F. A. Langworthy
Inventor,
Geo. B. Durkee

United States Patent Office.

GEORGE B. DURKEE, OF ALDEN, NEW YORK.

Letters Patent No. 69,549, dated October 8, 1867.

---

IMPROVED HARNESS-SNAP.

---

The Schedule referred to in these Letters Patent and making part of the same.

---

TO ALL WHOM IT MAY CONCERN:

Be it known that I, GEORGE B. DURKEE, of Alden, Erie county, and State of New York, have invented a certain new and improved Harness-Snap; and I do hereby declare that the following is a full and exact description thereof, reference being had to the accompanying drawings, making a part of this specification, in which—

Figure I is a front view of the same in connection with a strap and ring.

Figure II is a front view of the same disconnected therefrom.

Figures III and IV are longitudinal sections of the same.

The nature of this invention consists in the construction and use of a combined spring-lever and stop, in combination with a hook and one or two springs in such manner that the said lever, when forced by the action of the spring or springs into a position parallel to the shank of the hook, obstructs the opening of the hook, and when lifted from the said shank it will open the hook and leave a passage for the introduction of the ring or other part of a harness to which the hook is to be attached.

Letters of like name and kind refer to like parts in each of the figures.

The main body of this improved harness-snap, to which the strap is securely riveted or otherwise fastened, consists of the hook A, which has a flat metal shank, A'. B B' are two flat springs, which are riveted one upon each side to the shank A', as shown at b', their free ends projecting over the end of the shank. The end of one of the springs (B') is bent at right angles in a manner to form a chamber between the two. Within this chamber I place the fulcrum of the lever C, which has two lugs c' projecting longitudinally therefrom. These lugs form the short ends of the lever, and hence when the same is revolved or rocked upon its fulcrum the lugs act upon the springs and press them apart. Hence the action of the springs is to retain the lever in a position parallel with them and the shank A'. The free end of the lever C, when the same is in said parallel position, rests directly in front of and obstructs the opening of the hook A. The particular shape of said lever is quite immaterial. Between the fulcrum and the end which closes the hook it may be made circular, oval, (as represented in drawings,) or flat, and ornamented or plain, as may be preferred. As a modification in the construction of my improved harness-snap, either one of the springs B B' may be dispensed with, and the shank A' extended in a shape similar to that of the omitted spring, and in that case only one of the lugs c' will be required.

A harness-snap constructed as herein described may be made in a great many varieties without changing the principle of my invention. From the cheap and simple kind to the most elaborately finished they will all operate alike, and answer admirably the purpose for which they are intended.

What I claim as my invention, and desire to secure by Letters Patent, is—

1. A harness-snap, having a spring-lever and stop C, constructed and operating substantially as herein described.

2. The combination of the hook A, shank A', stop-lever C, and either one or both springs B B', arranged substantially as herein set forth.

GEO. B. DURKEE.

Witnesses:
B. H. MUEHLE,
F. A. LANGWORTHY.